United States Patent
Peters et al.

(10) Patent No.: US 11,961,275 B2
(45) Date of Patent: Apr. 16, 2024

(54) DEVICE AND METHOD FOR TRAINING A NORMALIZING FLOW

(71) Applicant: Robert Bosch GmbH, Stuttgart (DE)

(72) Inventors: Jorn Peters, Amsterdam (NL); Thomas Andy Keller, Amsterdam (NL); Anna Khoreva, Stuttgart (DE); Emiel Hoogeboom, Amsterdam (NL); Max Welling, Amsterdam (NL); Priyank Jaini, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 444 days.

(21) Appl. No.: 17/402,936

(22) Filed: Aug. 16, 2021

(65) Prior Publication Data

US 2022/0076044 A1 Mar. 10, 2022

(30) Foreign Application Priority Data

Sep. 4, 2020 (EP) .................................... 20194550

(51) Int. Cl.
*G06V 10/32* (2022.01)
*G06F 18/214* (2023.01)
*G06F 18/2321* (2023.01)
*G06V 10/46* (2022.01)
*G06V 10/75* (2022.01)

(52) U.S. Cl.
CPC ............ *G06V 10/32* (2022.01); *G06F 18/214* (2023.01); *G06F 18/2321* (2023.01); *G06V 10/46* (2022.01); *G06V 10/7515* (2022.01); *G06V 10/473* (2022.01)

(58) Field of Classification Search
CPC .... G06V 10/32; G06V 10/7515; G06V 10/46; G06V 10/473; G06F 18/214; G06F 18/2321
See application file for complete search history.

(56) References Cited

PUBLICATIONS

Gresele et al., "Relative Gradient Optimization of the Jacobian Term in Unsupervised Deep Learning," 34th Conference on Neural Information Processing Systems (NEURIPS 2020), Vancouver, Canada, 2020, pp. 1-25. <https://arxiv.org/abs/2006.15090v1> Downloaded Aug. 13, 2021.

(Continued)

*Primary Examiner* — Sumati Lefkowitz
*Assistant Examiner* — Michael Adam Shariff
(74) *Attorney, Agent, or Firm* — NORTON ROSE FULBRIGHT US LLP; Gerard A. Messina

(57) ABSTRACT

A computer-implemented method for training a normalizing flow. The normalizing flow predicts a first density value based on a first input image. The first density value characterizes a likelihood of the first input image to occur. The first density value is predicted based on an intermediate output of a first convolutional layer of the normalizing flow. The intermediate output is determined based on a plurality of weights of the first convolutional layer. The method for training includes: determining a second input image; determining an output, wherein the output is determined by providing the second input image to the normalizing flow and providing an output of the normalizing flow as output; determining a second density value based on the output tensor and on the plurality of weights; determining a natural gradient of the plurality of weights with respect to the second density value; adapting the weights according to the natural gradient.

10 Claims, 12 Drawing Sheets

(56) References Cited

PUBLICATIONS

Izadi, et al.: "Optimization of Graph Neural Networks with Natural Gradient Descent", Arxiv.Org, Cornell University Library, (2020), pp. 1-20, XP081746375.
Karami, et al.: "Invertible Convolutional Flow", 33rd Conf. on Neural Information Processing Systems (NeurIPS 2019), Vancouver, Canada, pp. 1-11, XP055749260.
Li, Xi-Lin: "Online Second Order Methods for Non-Convex Stochastic Optimizatins", San Jose, CA, arxiv.org, Cornell University Library (2018), pp. 1-9.
Lu and Huang: "Structured Output Learning with Conditional Generative Flows", arxiv.org, Cornell University Library, (2019), pp. 1-14, XP081366227.
Zhang, et al.: "Noisy Natural Gradient as Variational Inference", arxiv.org, Cornell University Library, (2018), pp. 1-13, XP081320123.

DEVICE AND METHOD FOR TRAINING A NORMALIZING FLOW

CROSS REFERENCE

The present application claims the benefit under 35 U.S.C. 119 of European Patent Application No. EP 20194550.8 filed on Sep. 4, 2020, which is expressly incorporated herein by reference in its entirety.

FIELD

The present invention concerns a method for training a normalizing flow, a method for using a normalizing flow, a method for classifying images by means of a normalizing flow, a normalizing flow, an image classifier, a computer program and a machine-readable storage medium.

BACKGROUND INFORMATION

L. Gresele, G. Fissore, A. Javaloy, B. Schölkopf, A. Hyvärinen, "*Relative gradient optimization of the Jacobian term in unsupervised deep learning*," Jun. 26, 2020, https://arxiv.org/abs/2006.15090v1 describes a method for training a fully connected normalizing flow.

SUMMARY

Determining the probability of an image to occur is a central problem in many technical applications. The probability of an image to occur may be understood as a probability for recording the image in a given domain and/or environment.

For example, image-based anomaly detection systems require assessing whether a given image is anomalous or not. This can, for example, be achieved by determining a probability indicating how likely it is that the given image occurs in general. If this probability is low, the image can be considered as an anomaly.

In general, for determining the probability of an image to occur, one can use methods from the field of machine learning. In particular, one can use a training dataset of images from a specific domain and/or environment, train a model with this data and then have the model predict a first density value for a new image, wherein the first density value can be understood to characterize a probability of the image to occur in the training dataset. As models for this task can be trained without labels, they are referred to as unsupervised models.

The choice of model may greatly influences the ability of predicting an accurate first density value, wherein this ability is also known as performance.

Normalizing flows allow for a very high performance with respect to predicting the correct probability. A normalizing flow is a trainable invertible mapping which is typically used to map between simple and complicated probability distributions. Recently, deep convolutional neural networks have been used as the learnable mapping in normalizing flows to model the complex distributions of image datasets.

One of the fundamental limitations of such models is the restriction that the determinant of the Jacobian of the transformation achieved by the deep convolutional neural network must be easily computable to allow for efficient training through maximization of the likelihood of the data. This has led to numerous proposed constrained classes of functions, which provide simple forms of the Jacobian. However, these constrained function classes ultimately result in suboptimal models of the probability density of the image data due to their fundamental limited representational power. Recently, L. Gresele, G. Fissore, A. Javaloy, B. Schölkopf, A. Hyvärinen, "*Relative gradient optimization of the Jacobian term in unsupervised deep learning*," Jun. 26, 2020, https://arxiv.org/abs/2006.15090v1 described a method for training a fully connected normalizing flow. The authors describe a method which allows for efficiently training normalizing flow models, which poses no restriction on the weight layers of a normalizing flow except for being fully connected.

However, as convolutional layers are generally better suited in a normalizing flow to process images as data, it would be desirable to obtain a method for efficiently training a normalizing flow model without constraining the weight layers to be fully connected.

SUMMARY

In accordance with an example embodiment of the present invention, a method allows for training a normalizing flow model comprising at least one convolutional layer without requiring the layer to be fully connected. It allows for efficiently training the normalizing flow allowing for a great speed up in training time. In turn, the speed up results in the fact that the normalizing flow can be trained with more images in a given amount of time, i.e., with more images given the same resources. This allows the normalizing flow to achieve a better performance.

In a first aspect, the present invention is concerned with a computer-implemented method for training a normalizing flow, wherein the normalizing flow is configured to predict a first density value based on a first input image, wherein the first density value characterizes a likelihood of the input image to occur, wherein the first density value is predicted based on an intermediate output of a first convolutional layer of the normalizing flow, wherein the intermediate output is determined based on a plurality of weights of the first convolutional layer, wherein the method for training comprises the steps of:

Determining a second input image;
Determining an output, wherein the output is determined by providing the second input image to the normalizing flow and providing an output of the normalizing flow as output;
Determining a second density value for the input image based on the output tensor and on the plurality of weights;
Determining a natural gradient of the plurality of weights with respect to the second density value;
Adapting the plurality of weights according to the natural gradient.

In the context of the present invention, images may be understood as data points which may be analyzed, e.g., classified, by means of methods from the field of machine learning. For analyzing images, an image may be understood as having being generated from a typically high-dimensional probability distribution.

An image may be obtained in a plurality of ways, especially by means of a camera sensor, a LIDAR sensor, a radar sensor, an ultrasonic sensor or a thermal camera. An image may also be obtained by means of synthetic generation, e.g., by rendering an image from a virtual scene or simulation in a computer or by drawing a digital image. Alternatively, an image may be obtained by joining two or more images obtained from the described approaches, e.g., combining a camera image and a LIDAR image into a single image. This may be achieved by, e.g., cropping or scaling the two or more images to have a same size and then stacking the two or more images.

In order to analyze an image, it is typically necessary to obtain a model for the probability distribution it has been generated from. However, finding such a model is complicated due to the high-dimensionality of the probability distribution.

A normalizing flow can be used here to ease the task of modelling the probability distribution. In the context of the present invention, a normalizing flow may be understood as a mapping from a first probability distribution of input images to a second probability distribution. The second probability distribution may be chosen by a user. The advantage of using a normalizing flow for images is hence that the complex first probability distribution may be mapped into the second probability distribution, wherein the second probability distribution may be chosen such that it has certain favorable traits. For example, in most normalizing flows a multi-variate standard normal distribution is used as the second probability distribution. This allows for, e.g., easily and efficiently assessing a density value for a given image: The image can be mapped to the second probability distribution by the normalizing flow and a density value may be computed based on the second probability distribution in closed form.

This density value advantageously represents a density value of the image with respect to the first probability distribution. The density value may be understood as characterizing a likelihood or probability of the image to occur. The likelihood of an image to occur may be understood as how likely it is for the image to be generated by the first probability distribution.

In accordance with an example embodiment of the present invention, n order to determine the mapping, a normalizing flow can be trained with a training dataset of images. The normalizing flow may be trained to maximize a log-likelihood of the training dataset with respect to the second probability distribution. This log-likelihood is also known as data log-likelihood. A normalizing flow may also be trained by minimizing a negative log-likelihood of the training dataset with respect to the second probability distribution.

The images from the training dataset may be understood as samples of the first probability distribution. Turning this intuition around, selecting a training dataset of specific images significantly defines the characteristics of the first probability distribution. For example, when training the normalizing flow with images of highway scenes only, an image of an urban scene will have a low first density value. However, if images of urban scenes are also among the training images, the first density value will rise.

A normalizing flow can be understood to comprise a sequence of functions. As normalizing flows are typically realized by means of a neural network, the functions may especially be layers of a neural network. A first layer transforms the input image into a first intermediate output. A second layer following the first layer in the sequence accepts the first intermediate output as input and transforms the first intermediate output into a second intermediate output. The procedure of taking an intermediate output as input and transforming it into another intermediate output is then repeated for the other layers of the sequence. The order of the sequence is defined by the flow of information. If a second layer takes the intermediate output of a first layer as input, the first layer is considered to precede the second layer and the second layer is considered to follow the first layer. The order of the sequence defines at least one layer without a predecessor, also known as input layer, and at least one layer without a successor, also known as output layer.

At least one layer of the normalizing flow may be parametrized by a plurality of weights. In the context of the present invention, the layer may in particular be a convolutional layer. A convolutional layer takes as input a first intermediate representation, typically in form of a tensor of a predefined height, width and number of channels, and in turn provides a second intermediate output typically in form of a second tensor, which also has a predefined height, width and number of channels. If the convolutional layer is used as an input layer, the first intermediate representation is the input image. If the convolutional layer is used as an output layer, the second intermediate representation can be understood as output of the normalizing flow. Preferably, the intermediate representations are given in the form of tensors.

A convolutional layer comprises a plurality of weights which may be organized as a plurality of filters. For determining an output, i.e., an intermediate representation, the convolutional layer performs a discrete convolutional of the plurality of filters, i.e., the weights, with the first intermediate representation. Preferably, the first intermediate representation is given in the form of a tensor of a predefined height, width, and number of channels. The result of the discrete convolution is then another tensor with a potentially different height and width. The number of channels is typically identical to the number of filters used in the convolutional layer. The result may directly be used as output. Alternatively, the convolutional layer may also offset each element of the output with at least one bias and/or apply an activation function to each element. Offsetting the elements with a bias may be achieved by adding a bias value to each channel, wherein there preferably exists a unique bias value for each channel.

For training, the weights and/or the at least one bias may be randomly chosen before the start of the training. Alternative, the weights and/or the at least one bias may be obtained from another normalizing flow, e.g., a normalizing flow which has been previously trained.

As the normalizing flow is a chained sequence of functions, determining an output based on an input image may hence be understood as providing the input image to the sequence of layers, consecutively determining the intermediate outputs and finally determining the output tensor. As the normalizing flow determines the output based on the sequence of layers, i.e., a plurality of chained functions, each intermediate output directly influences the resulting output. The output may, for example, be in the form of a tensor.

One of the characteristics of a normalizing flow is, that the direction of computation may be reversed, i.e., an image can be used as input to obtain a density value or a density value may be supplied and the normalizing flow may process the density value by a reversed chaining of its layers to obtain an image.

In order to achieve a desired mapping behavior of the normalizing flow that is also invertible, the weights of the convolutional layer need to be adapted. As the normalizing flow can be understood as a neural network, adapting the weights may be done by means of the conventional gradient descent framework using error backpropagation. Error backpropagation requires a loss function, wherein the loss function which can be understood as a function for determining a measure for how accurate the mapping of the normalizing flow is. Preferably, a loss function is used which characterizes a negative log-likelihood of the first probability distribution. Preferably, this can be achieved by expressing the loss function in terms of the second probability distribution using the change of variable formula $$p_x(x) = p_z(f(x)) \cdot \left| \frac{\partial f(x)}{\partial x} \right|,$$

wherein $p_x$ is a probability density function of the first probability distribution, $p_z$ is the probability density function of the second probability distribution, x is an input image and f is the normalizing flow.

The loss function may hence be defined as $$l(x) = \log p(f(x)) + \sum_{l=1}^{L} \log \left| \frac{\partial z_l}{\partial z_{l-1}} \right|,$$

wherein x is an input image to the normalizing flow, p is the probability density function of the second probability distribution, f is the mapping of the input image to the output image, i.e., the normalizing flow, L is the number of layers in the normalizing flow, $z_l$ is the output of the l-th layer in the sequence of layers, $z_0$ is the input image and $z_L$ is the output tensor. The value obtained by the loss function for an image can also be understood as the second density value in the provided method.

In order to determine a gradient for the weights, each layer determines a gradient of its input with respect to the loss function and provides this gradient to a preceding layer. The gradient provided this way is also known as error signal.

Unfortunately, computing the gradient for the first convolutional layer of the normalizing flow this way generally requires an inversion of a matrix, wherein the computational complexity of the inversion is cubical in the number of weights of the first convolutional layer. In turn, this means, that the training time of the normalizing flow is also cubical in the number of weights of the convolutional layers of the normalizing flow.

This characteristic has been tried to alleviate by designing special layers for which the computational complexity of the inversion is quadratic in the number of weights of the convolutional layer. In the context of normalizing flows, these special layers comprise coupling layers, squeeze layers for normalizing flows and masked convolution layers. However, these special layers restrict the transformations that can be achieved by a normalizing flow and hence negatively influence the accuracy of the mapping of the normalizing flow.

The inventors advantageously found that training the normalizing flow by means of a natural gradient of the plurality of weights of the first convolutional layer allows for a training time that is quadratic in the number of weights of the first convolutional layer of the normalizing flow without restricting the normalizing flow to comprise specific layers, which are designed for the gradient to be computed in a time that is quadratic in the number of weights of the specific layers. In turn, this allows for a normalizing flow to comprise standard convolutional layers which in turn allows the normalizing flow to learn a more accurate mapping and hence improve the performance of the normalizing flow.

The inventors found that the natural gradient of the first convolutional layer may be determined according to the formula:

$$\nabla_{w^{(l)}} = \delta_l * (w^{(l)*T} h^{(l)})^T + w^{(l)} \cdot H^l \cdot W^l,$$

wherein $\nabla_{w^{(l)}}$ is the natural gradient, $\delta_l$ is an error signal for the first convolutional layer obtained from a layer succeeding the first convolutional layer by error backpropagation or obtained from the loss function directly if the first convolutional layer is an output layer of the normalizing flow, $w^{(l)}$ is the plurality of weights of the first convolutional layer, $H^l$ is a height of an input of the first convolutional layer, $W^l$ is a width of the input, * denotes a convolution operation and $*^T$ denotes a transposed convolution operation.

In another aspect, the present invention is concerned with a computer-implemented method for training an image classifier, wherein the image classifier is configured to determine an output signal characterizing a classification of a first input image. In accordance with an example embodiment of the present invention, the method comprises the steps of:

Determining a training dataset, wherein the training dataset comprises a plurality of second input images;

Training a normalizing flow model based on the training dataset and according to an aspect of the present invention;

Providing the trained normalizing flow model to the image classifier;

Providing the image classifier as trained image classifier.

The output signal may characterize at least one class, which the image classifier deems the first input image to belong to. Alternatively or additionally, the output signal may characterize a class and a position of at least one object depicted in the first input image. Alternatively or additionally, the output signal may characterize a semantic segmentation of the first input image, i.e., a classification of the pixels of the first input image.

The first input image may be a result of processing another image, e.g., by cropping the other image and/or rotating the other image and/or scaling the pixel values of the other image and/or flipping the other image around one of its axes.

The normalizing flows may be provided to the image classifier so that the classifier can determine a classification at inference time based on an output of the normalizing flow.

Compared to using other normalizing flows in the image classifier, which have not been trained using the natural gradient, the advantage of using a normalizing flow trained in accordance with an aspect of the present invention is that the increased performance of the normalizing flow increases the classification performance of the image classifier. The term "classification performance" may be understood as a measure for the ability of the image classifier to predict a desired class of an input image.

It can be further imagined that the trained classifier is used for classifying a first input image (x), wherein the image classifier (60) provides an output signal (y) characterizing a classification of the first input image (x), the method comprising the steps of:

Training the image classifier as described above;

Predicting a first density value for the first input image (x) using the normalizing flow from the image classifier (60);

Providing the output signal (y) such that it characterizes a first class if the first density value is below than a predefined threshold;

Providing the output signal (y) such that it characterizes a second class if the first density value is equal to the predefined threshold or above the predefined threshold.

The image classifier may hence be used for one-class classification. In one-class classification, an image classifier is typically provided with images of one class only during training. At inference time, i.e., when using the trained image classifier to classify an input image, the classifier may then classify an image to either belong to the class of images it has been trained with or to not belong to the class. As the image classifier may base its classification on the output of the normalizing flow, the classification performance of the image classifier when used for one-class classification can advantageously be improved over other one-class classifiers as the normalizing flow is capable of modelling the distribution of the images from the one class more accurately.

The one-class classification approach as presented above can especially be used for anomaly detection, wherein anomaly detection can also be viewed as outlier detection or novelty detection. In anomaly detection, the general goal can be considered to identify data points (in the case of the present invention input images), which do not share certain characteristics with data points comprised in a dataset. In the context of the present invention, this may be understood as identifying input images, which deviate substantially from the images in the training dataset. The first class may, for example, be understood as characterizing an image to be anomalous while the second class may be understood as characterizing an image as non-anomalous.

If used for anomaly detection, the presented method has the same advantages as already described for the one-class classification.

It can be further provided that the training dataset further comprises for each second input image a corresponding desired output signal, wherein the desired output signal characterizes a classification of the corresponding second input image, and the method further comprises the steps of:
  Splitting the training dataset into a plurality of subsets, wherein each subset comprises the second input images that correspond with the desired output signals that characterize the same class;
  Training a normalizing flow for each subset, wherein each normalizing flow corresponds to the class characterized by the corresponding output signals of the second input images the normalizing flow is trained with;
  Providing the trained normalizing flows to the image classifier.

The image classifier may hence also comprise a plurality of normalizing flows, wherein each normalizing flow is trained with a specific subset of the training dataset. For this, the training dataset can be split into subsets, wherein images of a subset belong to the same class. This can be achieved by splitting the training dataset based on the desired output signals as described above. A desired output signal may, for example, be assigned to its corresponding first input image by an annotation provided by a human or an annotation provided by another image classifier annotating the image.

Classifying a first input image may hence be achieved by:
  Training the image classifier, wherein training comprises training the plurality of normalizing flows;
  Predicting a plurality of first density values, wherein the plurality of first density values is predicted by providing the first input image to the normalizing flows from the image classifier, have each normalizing flow predict a first density value and providing the first density values predicted from the normalizing flows as a plurality of first density values;
  Adapting each first density value in the plurality of first density values, wherein a first density value is adapted by multiplying it with a predefined value;
  Providing the plurality of first density values as output signal (y).

The image classifier may hence be understood as a form of Bayesian classifier. A Bayesian classifier classifies an input signal (in the case of the present invention an input image) according to the formula $$p(y|x) = \frac{p(y) \cdot p(x|y)}{p(x)},$$

wherein p(y|x) known as posterior probability, i.e., a probability for the input signal x to belong to a class y, p(y) is known as the prior probability for class y, p(x|y) is known as a class-conditional density value, i.e., a density value for x under the assumption that it belongs to class y and p(x) is a density value characterizing a probability of x to occur. A Bayesian classifier typically classifies the input signal into as belonging to the class that has the largest posterior probability among all classes. As p(x) is constant for all classes, it is typically not determined. If only the enumerator of the above equation is determined, the result is a scaled posterior probability.

Viewing the image classifier as Bayesian classifier, the plurality of first density values may be understood as the class conditional density values. As a first value has been predicted by a normalizing flow corresponding to a class, the first density value may also be understood to correspond to the class. Each first density value may be scaled by a predefined value, wherein the predefined value is specific for the class that corresponds to the first density value. There may hence be a plurality of predefined values, each of them being a prior probability.

Multiplying the first density values with their respective predefined values may hence be understood as determining the scaled posterior probabilities for each class.

The output signal may be an index of a class that has the largest scaled posterior probability. Alternatively or additionally, the output signal may comprise the largest scaled posterior probability. Alternatively or additionally, the output signal may comprise all scaled posterior probabilities.

An advantage of this approach is that the classification performance of the image classifier is increased. This is due to the image classifier determining the output signal based on the first density values, i.e., class-conditional density values. As the normalizing flows used for determining the first density values have been trained with the natural gradient, the performance of the normalizing flows has been increased, which directly leads to a better prediction of first density values and as a consequence to a better classification performance of the classifier.

It can be further provided that any one of the image classifiers described above is used for operating a device, wherein the device is operated based on an output signal of the image classifier.

In accordance with an example embodiment of the present invention, the device may, for example, be an at least partially autonomous vehicle, a robot, a manufacturing machine, a digital personal assistant, an access control system, a surveillance system, a medical imaging system or a medical analysis device.

The image classifier is preferably used for detecting a state or characteristic of an environment of the device or for detecting whether an input image of the environment of the device is anomalous.

An advantage of using any one of the image classifiers described above for operating the device is hence that the device is capable of determining a state or characteristic of the environment more accurately and may hence be operated in a safer and/or more reliable and/or expected way.

Example embodiments of the present invention are discussed below with reference to the following figures in more detail.

DETAILED DESCRIPTION OF EXAMPLE EMBODIMENTS

Figure 1:
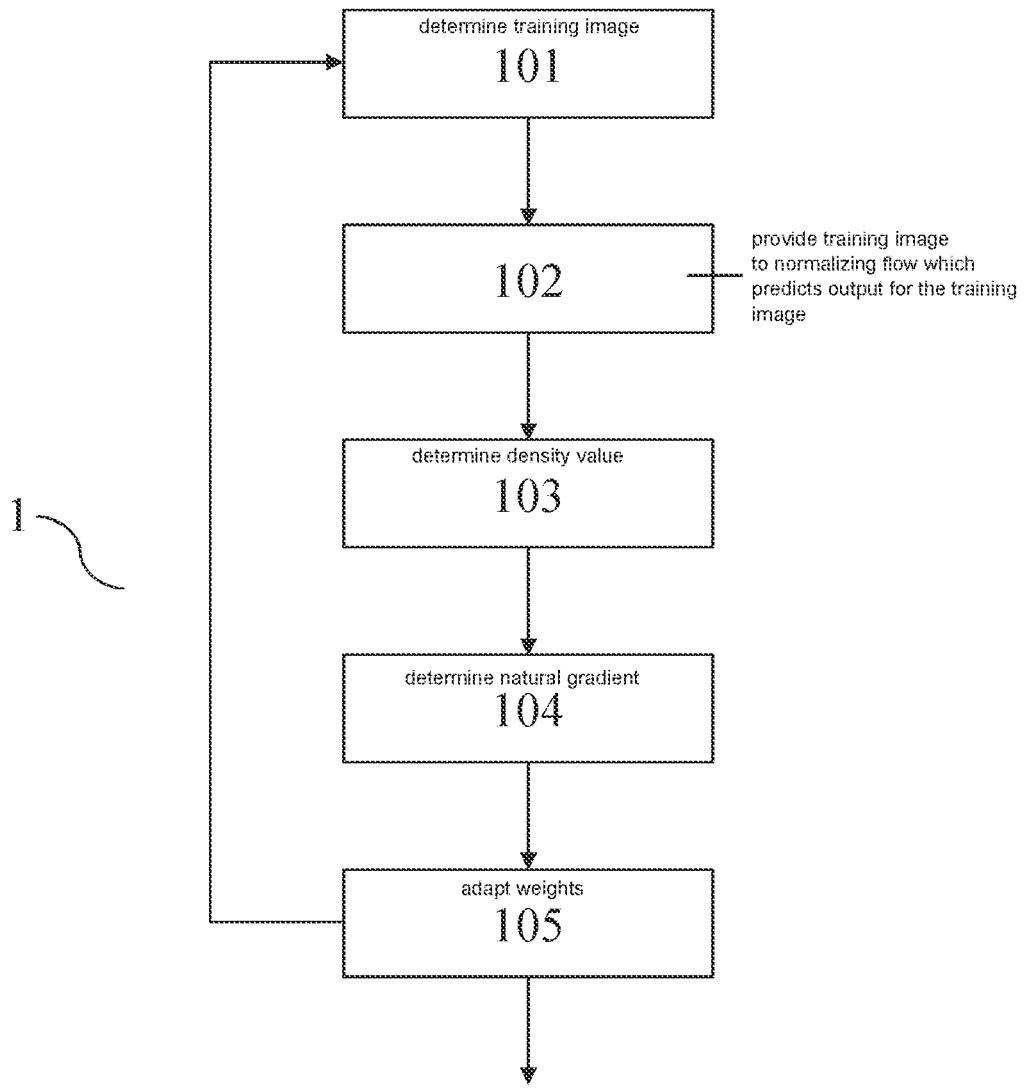
FIG. 1 shows schematically a method for training a normalizing flow, in accordance with an example embodiment of the present invention.

Shown in FIG. 1 is an example embodiment of a first method (1) for training a normalizing flow in the form of a flow chart. The normalizing flow is configured to accept images as inputs and comprises convolutional layers. Preferably, the normalizing flow consists only of convolutional layers as layers. Preferably, the normalizing flow does not comprise coupling or masked convolution layers as are used in, e.g., Real NVP.

In a first step (101) a training image ($x_i$) is determined. The image may preferably be determined from a computer-implemented database comprising images that the normalizing flow shall be trained with, e.g., a training dataset of training images. Alternatively, the image may also be determined from a sensor during operation of the sensor. For example, the sensor may record an image and the image may then be used directly as training image ($x_i$) for the normalizing flow. Preferably, the training image (xi) is in the form of a three-dimensional tensor of a predefined height, width and number of channels.

In a second step (102) the training image ($x_i$) is provided to the normalizing flow and the normalizing flow predicts an output ($\hat{y}_i$) for the training image ($x_i$). This is done by determining the intermediate representations of the layers of the normalizing flow. In particular, a first convolutional layer of the normalizing flow is provided an input, which may either be the training image ($x_i$) or an intermediate representation obtained by another layer.

The first convolutional layer comprises a predefined amount of filters, wherein the weights of the filters represent the weights of the first convolutional layer. The input is then discretely convolved with the filters in order to determine a convolution result. The convolution result may preferably be given in the form of a tensor. The convolution result may then be provided as intermediate representation. Alternatively, the convolution result be further adapted before providing it as intermediate result by applying an activation function to each element of the convolution result. As activation function, an invertible and non-linear function may be chosen such as a Leaky-ReLU, an ELU, a SELU, a GELU, a Softplus, a Swish or a PReLU.

The intermediate result may be provided to other layers of the normalizing flow. If the first convolutional layer is used as output layer, the intermediate result may be provided as output of the normalizing flow.

In a third step (103) a density value is determined based on the output tensor. The density value is computed according to the formula $$v = \log p(\hat{y}_i) + \sum_{l=1}^{L}\left(\sum_{d=1}^{D}\log\left|\sigma_l'\left(h_d^{(l)}\right)\right| + \log\left|\det T(w^{(l)})\right|\right),$$

wherein v is the density value, $\log p(\hat{y}_i)$ the logarithm of a multivariate normal distribution evaluated at the output $\hat{y}_i$ of the normalizing flow, l is an index variable that runs over the total amount of all convolutional layers L, $h^{(l)}$ is a D-dimensional output of the l-th layer, $h_d^{(l)}$ is the value at the d-th dimension of $h^{(l)}$, $w^{(l)}$ are the weights of the l-th convolutional layer and T is a function that maps the weights of the l-th convolutional layer to a 2-dimensional matrix representation, e.g., a Toeplitz matrix.

In a fourth step (104), a natural gradient with respect to the density value is determined. The natural gradient may be computed according to the formula $$\nabla_{w^{(l)}} = \delta_l * (w^{(l)*T} h^{(l)})^T + w^{(l)} \cdot H^l \cdot W^l,$$

wherein $\nabla_{w^{(l)}}$ is the natural gradient, $\delta_l$ is an error signal for the first convolutional layer obtained from a layer succeeding the first convolutional layer by error backpropagation or obtained from the loss function directly if the first convolutional layer is an output layer of the normalizing flow, $w^{(l)}$ is the plurality of weights of the first convolutional layer, $H^l$ is a height of an input of the first convolutional layer, $W^l$ is a width of the input, * denotes a convolution operation and $*^T$ denotes a transposed convolution operation.

The error signal can be obtained by means of standard error backpropagation.

In a fifth step (105), the weights of the first convolutional layer are adapted according to the natural gradient. This weight update can be achieved according to the weight update as done in conventional gradient-based optimization approaches such as stochastic gradient descent, Adam, AdamW or AdaGrad, wherein the natural gradient is used to replace to otherwise used gradient (the otherwise used gradient may also be known as the absolute gradient). For example, the weights may be adapted according to the conventional gradient descent formula for neural networks $$w^{(l)} \to w^{(l)} - \eta \cdot \nabla_{w^{(l)}},$$

wherein $\to$ indicates the adaption of the weights and $\eta$ is a learning rate. Additionally, a momentum-based optimization may be used as well.

The steps (101, 102, 103, 104, 105) may be repeated iteratively. In each iteration, a new first input image ($x_i$) may be obtained from the training dataset or the sensor. The steps may be repeated until a predefined amount of iterations has passed. Alternatively, it is also possible that the training is run iteratively until the density value v falls below a predefined threshold or until the average density value for a plurality of images falls below a predefined threshold. The images in this case may either be a plurality of images from the training dataset or a plurality of images from another dataset, i.e., a validation dataset.

Figure 2:
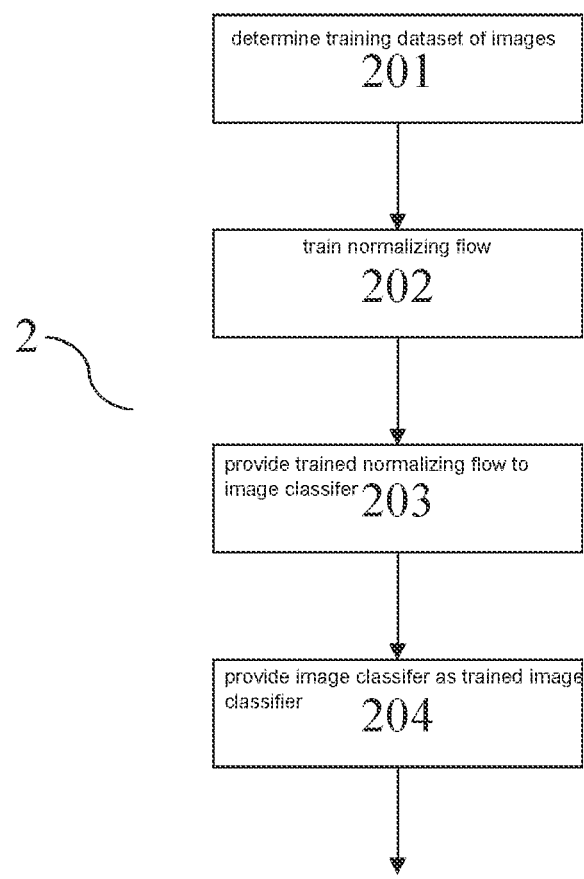
FIG. 2 shows schematically a method for training an image classifier comprising the normalizing flow, in accordance with an example embodiment of the present invention.

Shown in FIG. 2 is an example embodiment of a second method (2) for training an image classifier.

In a first step (201), a training dataset of images is determined. The training dataset may for example be determined by choosing images from computer-implemented database. Alternatively, the dataset may be determined by recording images with at least one sensor and providing the recorded images as training dataset.

In a second step (202) a normalizing flow is trained according the first method (1) based on the training dataset.

In a third step (203) the trained normalizing flow is provided to the image classifier and in a fourth step (204) the image classifier is provided as trained image classifier.

In further embodiments, it can be provided that a plurality of training datasets is determined in the first step (201) this may be achieved by, e.g., splitting a dataset into a plurality of datasets and providing the plurality of datasets as plurality of training datasets. The dataset may be split according to a pluralities of classes. For example, each image in the dataset may be assigned a class. The dataset can then be split such that each dataset of the plurality of datasets comprises images of one class only. Alternatively, the dataset can be split according to whether an image belongs to a predefined combination of classes. The combination of classes may be expressed, e.g., in a Boolean statement. For example, it can be imagined that the dataset contains images of classes A, B and C and the dataset is split such that a first dataset of a plurality of datasets comprises images of classes A and B but not C and a second dataset comprises images of class C.

In the further embodiments, it can further be provided that in the second step (202) a plurality of normalizing flows is trained, wherein one normalizing is trained for each training dataset of the plurality of training datasets according to the first method (1).

In the further embodiments, it can be further provided that in the third step (203) the plurality of trained normalizing flows are provided to the image classifier.

Figure 3:
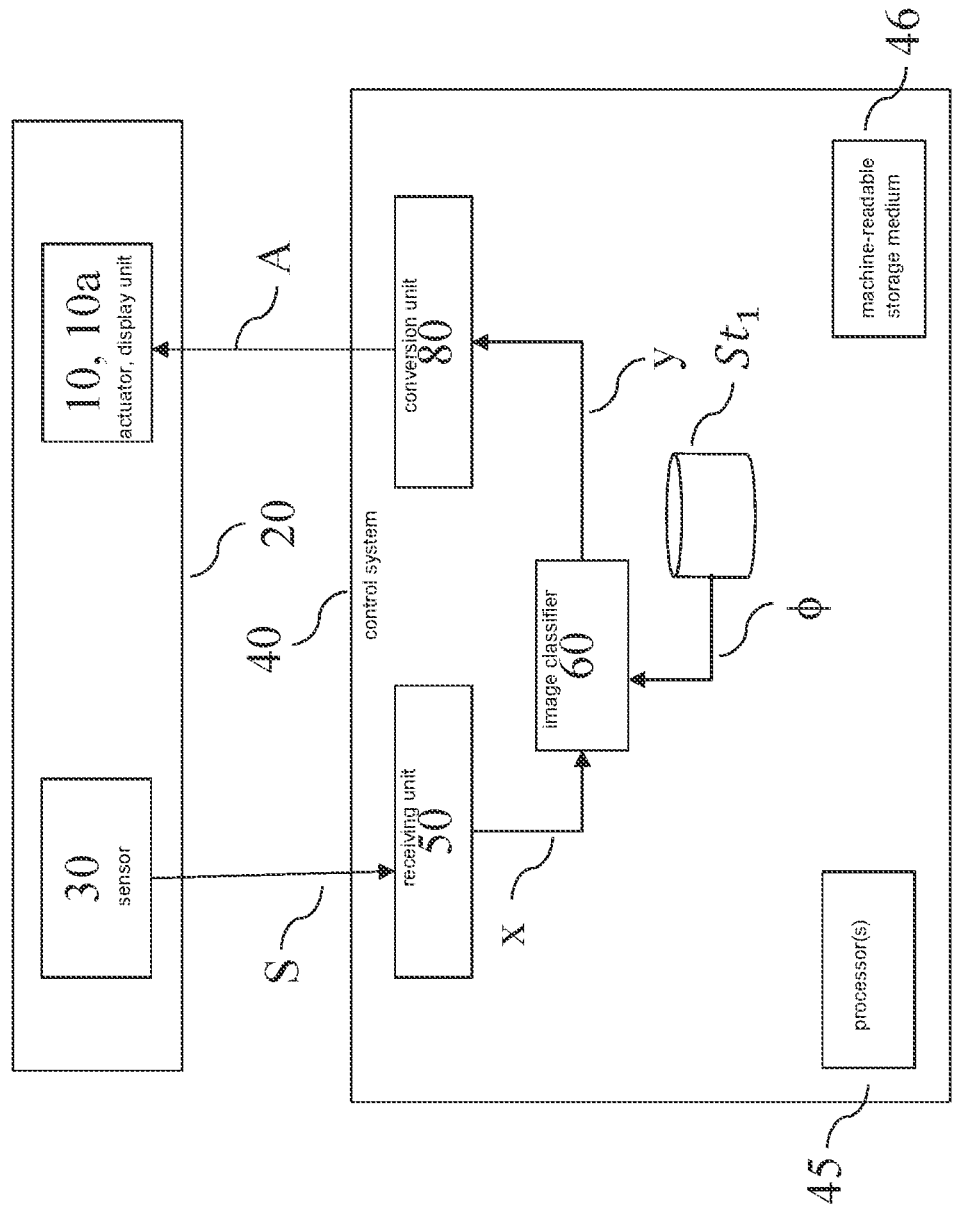
FIG. 3 shows a control system comprising the image classifier controlling an actuator in its environment, in accordance with an example embodiment of the present invention.

Shown in FIG. 3 is a control system (40) for controlling an actuator (10) using an image classifier (60) trained according to the second method (2). At preferably evenly spaced points in time, a sensor (30) senses a condition of an environment (20) of the sensor (30) and/or a condition of the control system (40). The sensor (30) may comprise several sensors. The sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input images (x). This may be achieved by applying preprocessing methods such as, e.g., scaling, rotating, cropping or color correcting the sensor signal (S). Alternatively, in case of no receiving unit (50), each sensor signal (S) may directly be taken as an input image (x). The input image (x) may, for example, be given as an excerpt from the sensor signal (S). Alternatively, the sensor signal (S) may be processed to yield the input image (x). In other words, the input image (x) is provided in accordance with the sensor signal (S).

The input image (x) is then passed on to the image classifier (60).

The image classifier (60) (in particular the at least one normalizing flow comprised by the image classifier) is parametrized by parameters ($\phi$) which are stored in and provided by a parameter storage ($St_1$).

The image classifier (60) determines an output signal (y) from the input images (x). The output signal (y) comprises information that assigns one or more labels to the input image (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 4:
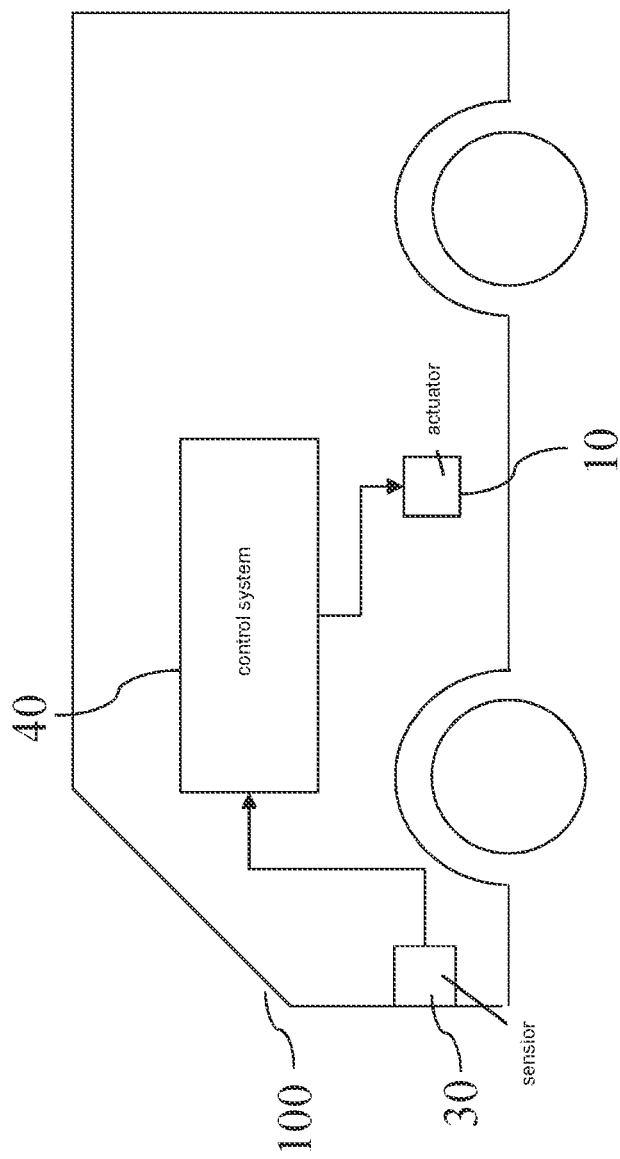
FIG. 4 shows the control system controlling an at least partially autonomous robot, in accordance with an example embodiment of the present invention.

FIG. 4 shows an example embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated into the vehicle (100).

The image classifier (60) may be configured to determine the scene of location of the vehicle (100), e.g., urban, highway or rural. Based on the classification of the image classifier (60) at least partial autonomous operation of the vehicle (100) may be restricted. For example, it can be imagined that the vehicle (100) is configured to autonomously navigate on a highway. If the image classifier (100) determined the scene of location for the input image (x) to be a highway, autonomous navigation may be enabled to be activated by a driver of the vehicle (100) or an operator of the vehicle (100). The conversion unit (80) may set the control signal (A) such that the actuator (10) may be controlled autonomously. If the scene of location is classified to be different from a highway, the conversion unit (80) may set the control signal (A) such that the actuator (10) may not be controlled autonomously. Alternatively or additionally, the control signal (A) may be set such that operation of the vehicle (100) is transferred from the vehicle (100) to a driver or operator of the vehicle (100).

The actuator (10), which is preferably integrated into the vehicle (100), may be given by a brake, a propulsion system, an engine, a drivetrain, or a steering of the vehicle (100).

Alternatively or additionally, the control signal (A) may also be used to control the display (10a), e.g., for displaying the currently detected scene of location.

In further embodiments, the image classifier (60) may be configured to detect whether an input image (x) is anomalous or not. If an anomalous input image (x) is detected by the image classifier (60), the conversion unit (80) may set the control signal (A) such that the autonomous operation of the vehicle (100) is limited, e.g., by reducing a maximum allowed speed of the vehicle (100). Alternatively or additionally, the control signal (A) may be set such that operation of the vehicle (100) is transferred from the vehicle (100) to the driver or operator of the vehicle (100).

Figure 5:
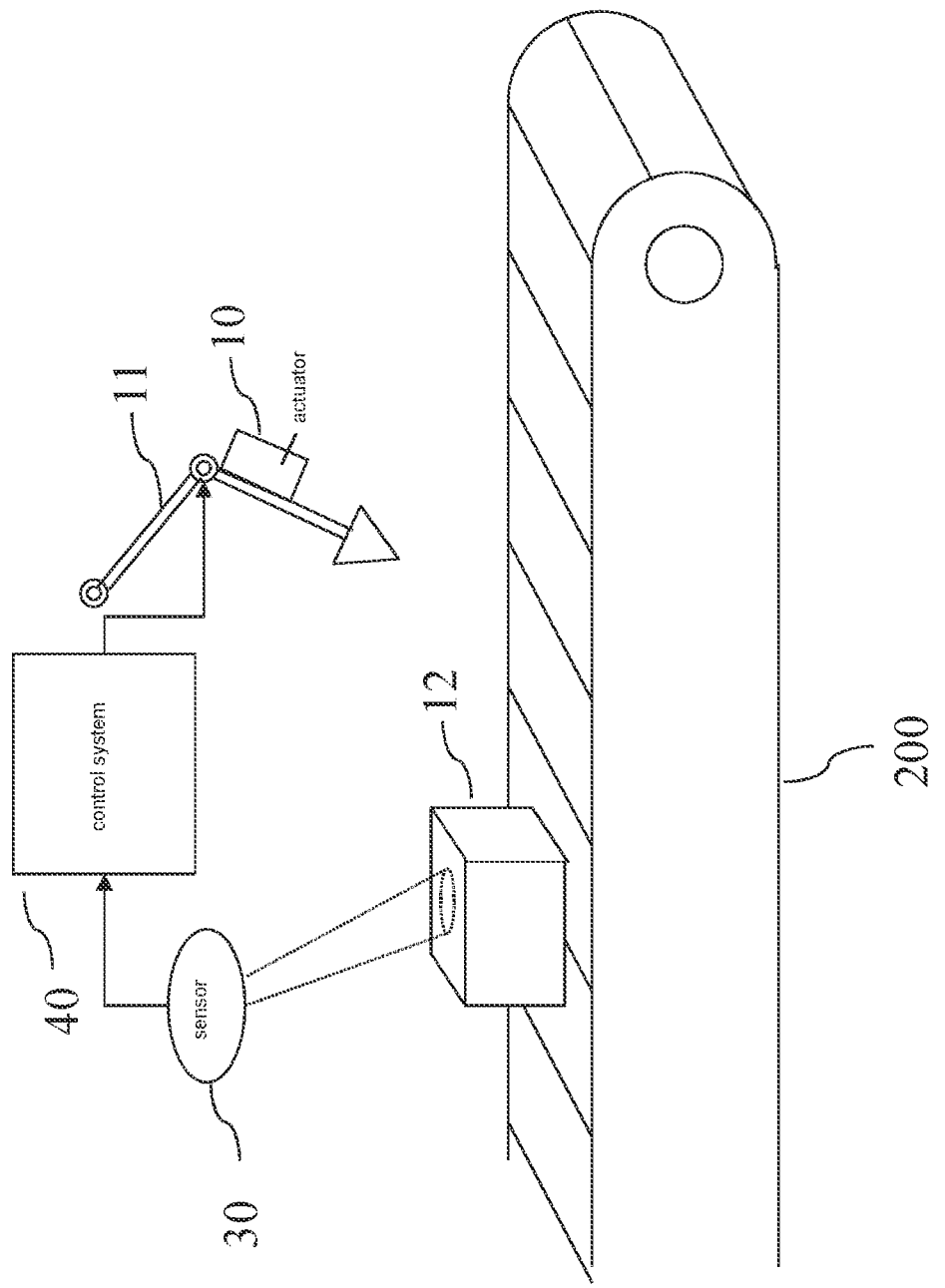
FIG. 5 shows the control system controlling a manufacturing machine, in accordance with an example embodiment of the present invention.

Shown in FIG. 5 is an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12).

The image classifier (60) may classify the manufactured product (12) into one of a plurality of classes. The actuator (10) may then be controlled depending on the determined class of the manufactured product (12) for a subsequent manufacturing step of the manufactured product (12). For example, the actuator (10) may be controlled to cut the manufactured product at a specific location of the manufactured product itself. Alternatively or additionally, it may be envisioned that the image classifier (60) classifies, whether the manufactured product is broken or exhibits a defect. The actuator (10) may then be controlled as to remove the manufactured product from the transportation device. Alternatively, the image classifier (60) may be configured to determine whether the manufactured product (12) is anomalous or not.

Figure 6:
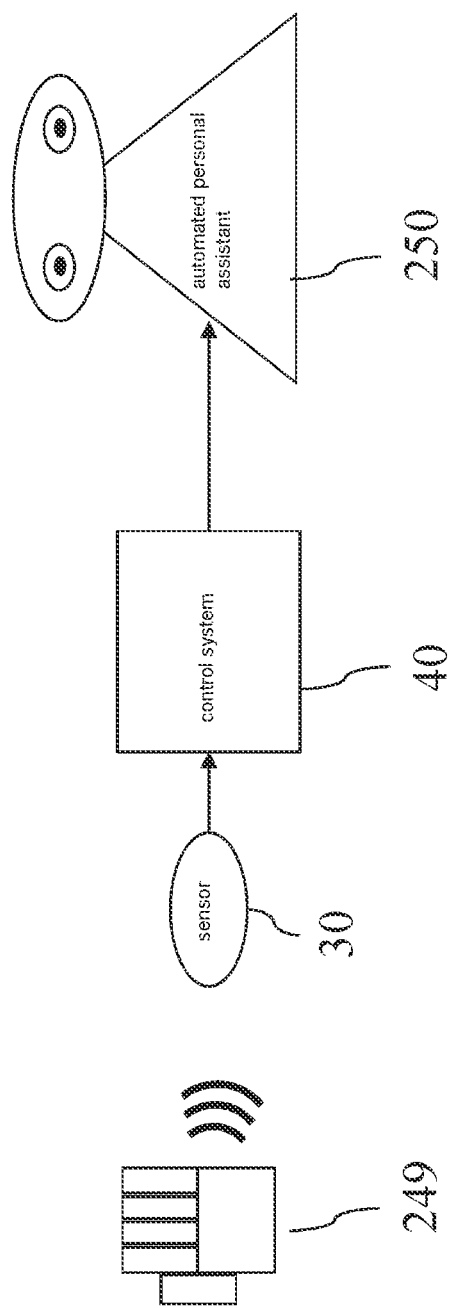
FIG. 6 shows the control system controlling an automated personal assistant, in accordance with an example embodiment of the present invention.

Shown in FIG. 6 is an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines control signals (A) for controlling the automated personal assistant (250). The control signals (A) are determined in accordance with the sensor signal (S) of the sensor (30). The sensor signal (S) is transmitted to the control system (40). For example, the image classifier (60) may be configured to, e.g., carry out a gesture recognition algorithm to identify a gesture made by the user (249). The control system (40) may then determine a control signal (A) for transmission to the automated personal assistant (250). It then transmits the control signal (A) to the automated personal assistant (250).

For example, the control signal (A) may be determined in accordance with the identified user gesture recognized by the image classifier (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 7:
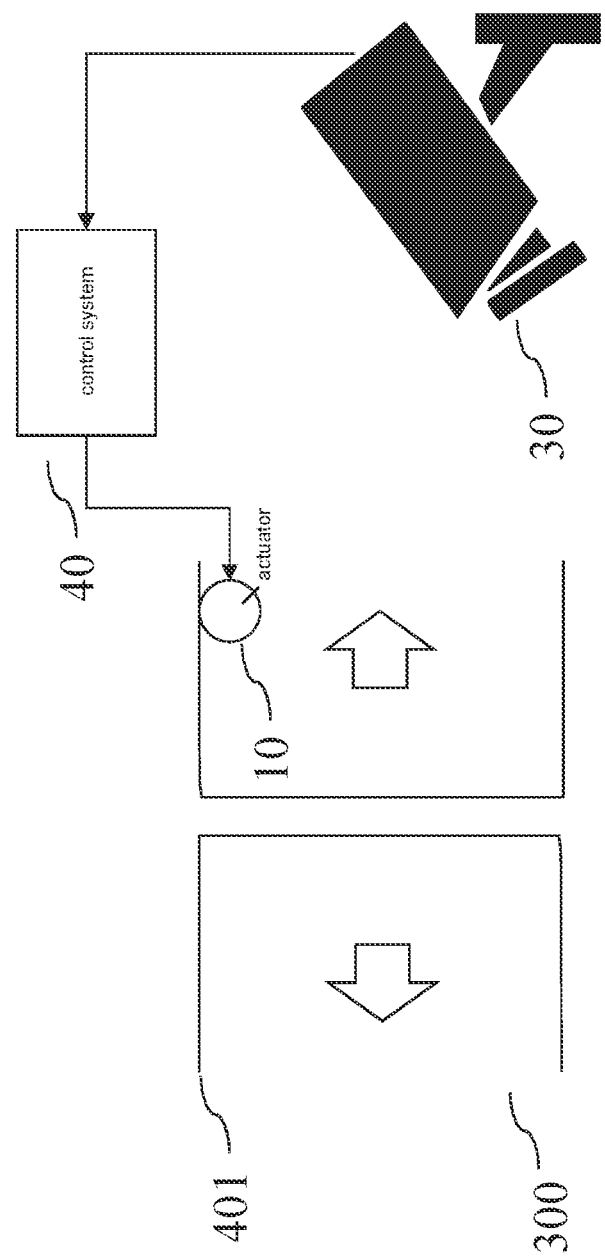
FIG. 7 shows the control system controlling an access control system, in accordance with an example embodiment of the present invention.

Shown in FIG. 7 is an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for classifying a person's face.

The image classifier (60) may be configured to classify an identity of the person, e.g., by matching the detected face of the person with other faces of known persons stored in a database, thereby determining an identity of the person. The control signal (A) may then be determined depending on the classification of the image classifier (60), e.g., in accordance with the determined identity. The actuator (10) may be a lock which opens or closes the door depending on the control signal (A). Alternatively, the access control system (300) may be a non-physical, logical access control system. In this case, the control signal may be used to control the display (10a) to show information about the person's identity and/or whether the person is to be given access.

Figure 8:
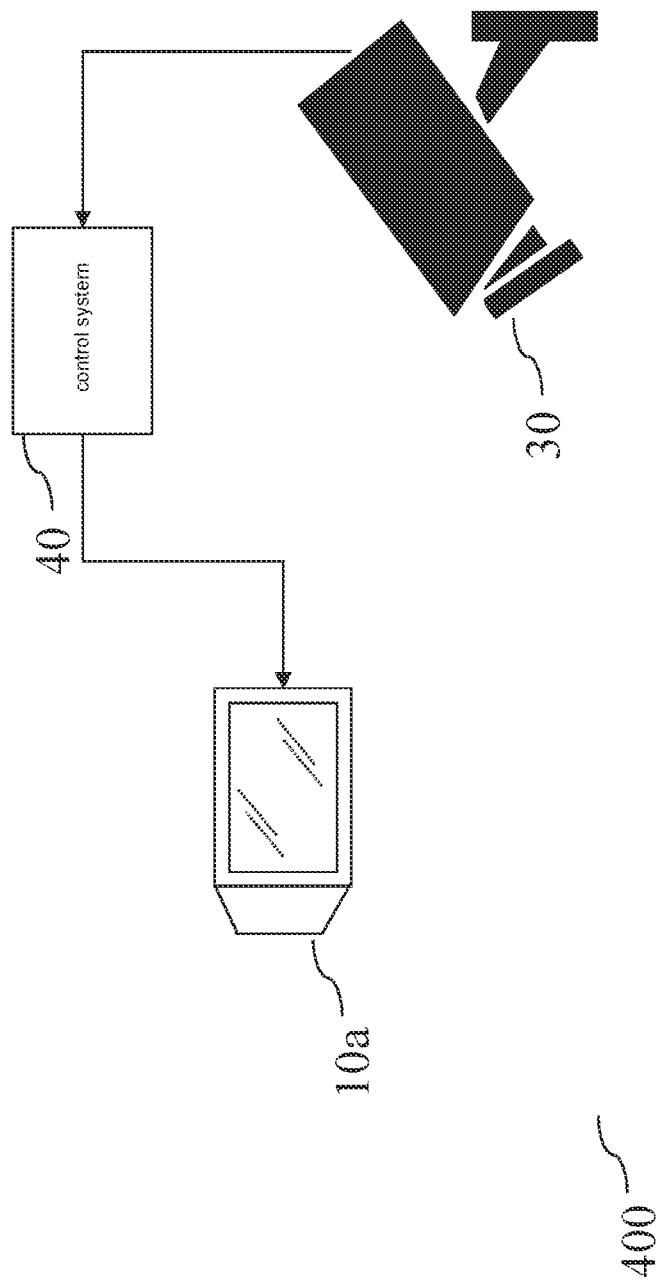
FIG. 8 shows the control system controlling a surveillance system, in accordance with an example embodiment of the present invention.

Shown in FIG. 8 is an embodiment in which the control system (40) controls a surveillance system (400). This embodiment is largely identical to the embodiment shown in FIG. 5. Therefore, only the differing aspects will be described in detail. The sensor (30) is configured to detect a scene that is under surveillance. The control system (40) does not necessarily control an actuator (10), but may alternatively control a display (10a). For example, the image classifier (60) may determine a classification of a scene, e.g., whether the scene detected by an optical sensor (30) is normal or whether the scene exhibits an anomaly. The control signal (A), which is transmitted to the display (10a), may then, for example, be configured to cause the display (10a) to adjust the displayed content dependent on the determined classification, e.g., to highlight an object that is deemed anomalous by the image classifier (60).

Figure 9:
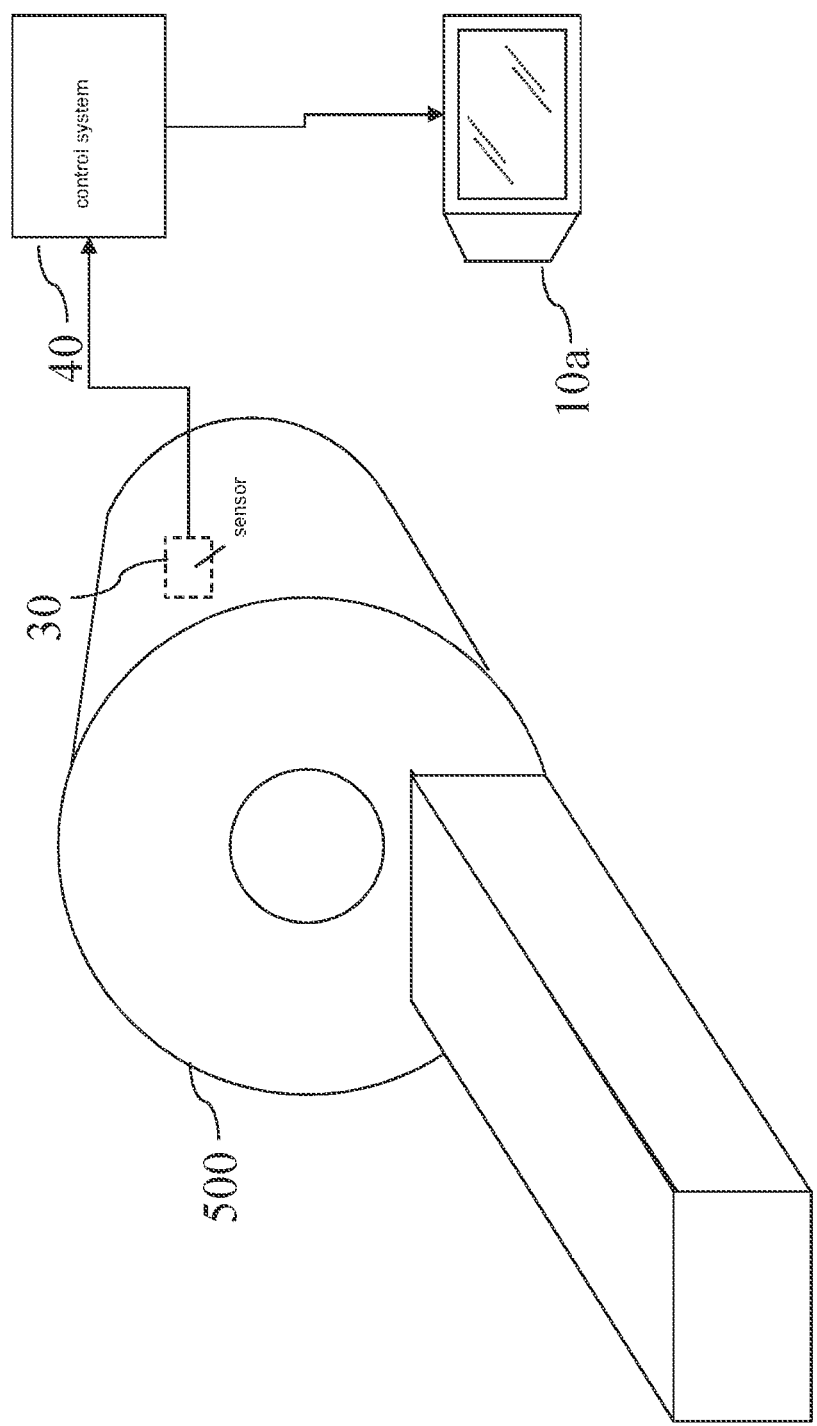
FIG. 9 shows the control system controlling an imaging system, in accordance with an example embodiment of the present invention.

Shown in FIG. 9 is an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The image classifier (60) may then determine a classification of at least a part of the sensed image.

The control signal (A) may then be chosen in accordance with the classification, thereby controlling a display (10a). For example, the image classifier (60) may be configured to detect different types of tissue in the sensed image, e.g., by classifying the tissue displayed in the image into either malignant or benign tissue. The control signal (A) may then be determined to cause the display (10a) to display different tissues, e.g., by displaying the input image (x) and coloring different regions of identical tissue types in a same color.

Figure 10:
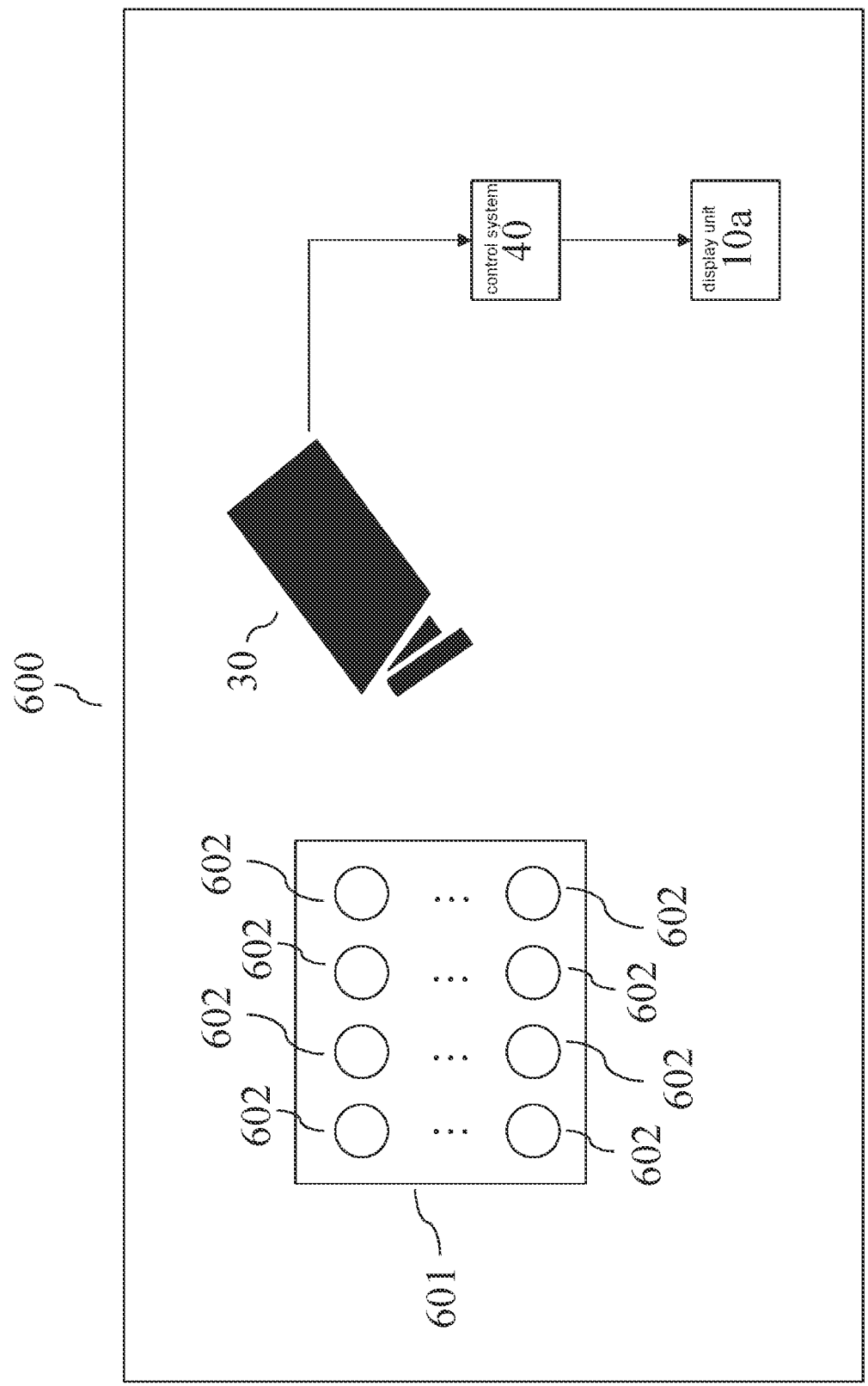
FIG. 10 shows the control system controlling a medical analysis system, in accordance with an example embodiment of the present invention.

Shown in FIG. 10 is an embodiment of a medical analysis system (600) being controlled by the control system (40). The medical analysis system (600) is supplied with a microarray (601), wherein the microarray comprises a plurality of spots (602, also known as features) which have been exposed to a medical specimen. The medical specimen may, for example, be a human specimen or an animal specimen, e.g., obtained from a swab.

The microarray (601) may be a DNA microarray or a protein microarray.

The sensor (30) is configured to sense the microarray (601). The sensor (30) is preferably an optical sensor such as a video sensor.

The image classifier (60) is configured to classify a result of the specimen based on an input image (x) of the microarray supplied by the sensor (30). In particular, the image classifier (60) may be configured to determine whether the microarray (601) indicates the presence of a virus in the specimen.

The control signal (A) may then be chosen such that the display (10a) shows the result of the classification.

Figure 11:
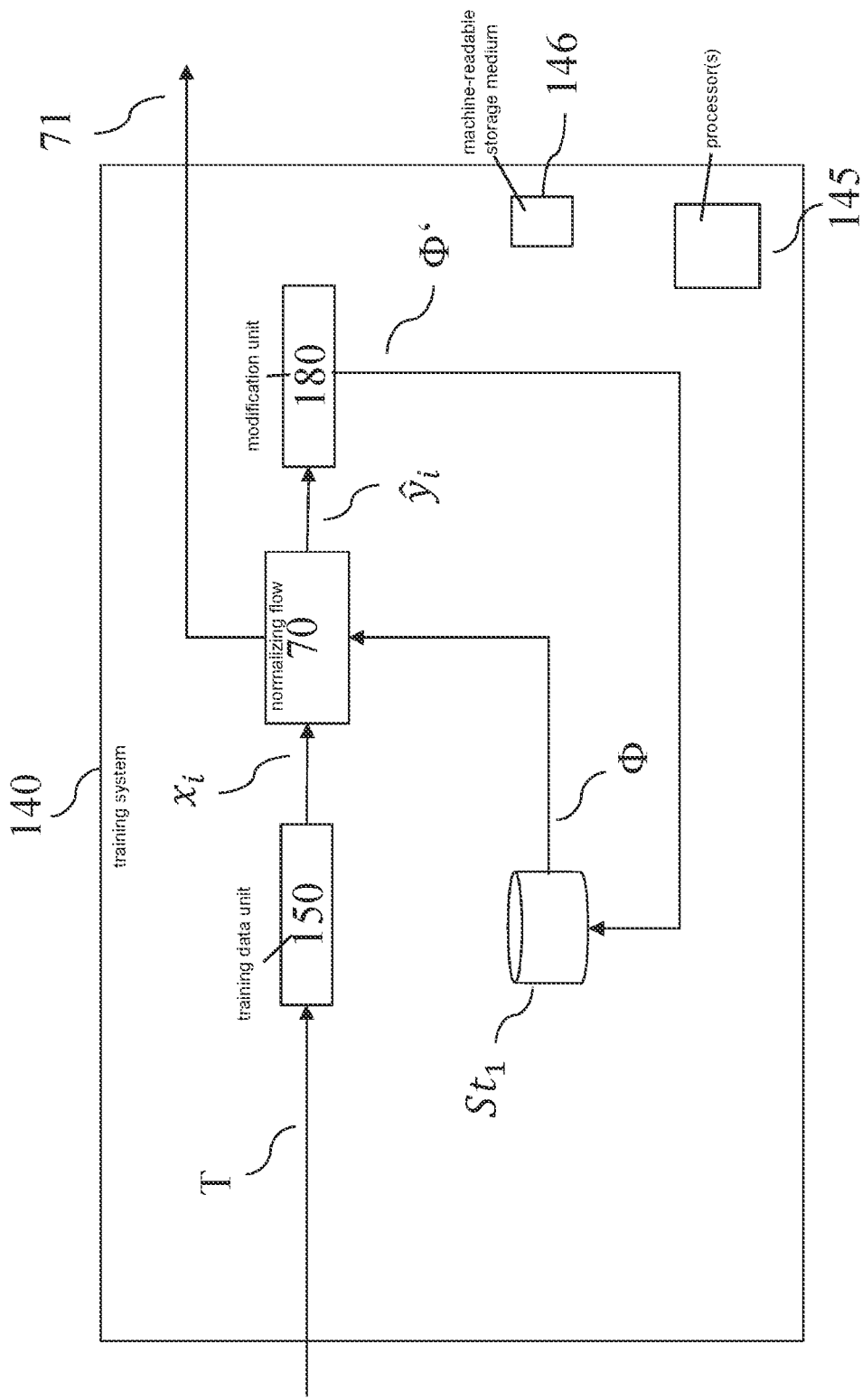
FIG. 11 shows a training system for training a normalizing flow, in accordance with an example embodiment of the present invention.

FIG. 11 shows an embodiment of a training system (140) for training a normalizing flow (70) the image classifier (60), wherein the normalizing flow (70) comprises trainable parameters ($\Phi$), especially the weights of the convolutional layers comprised in the normalizing flow (70). The trainable parameters ($\Phi$) are provided by a first computer-implemented database ($St_1$). The training system (140) receives a training data set (T). The training data set (T) comprises a plurality of input images ($x_i$) which are used for training the normalizing flow (70).

For training, a training data unit (150) accesses the training data set (T). The training data unit (150) determines from the training data set (T) preferably randomly at least one input image and transmits the input image ($x_i$) to the normalizing flow (70). The normalizing flow (70) determines an output ($\hat{y}_i$) based on the input image ($x_i$).

The determined output ($\hat{y}_i$) is transmitted to a modification unit (180).

Based on the determined output ($\hat{y}_i$), the modification unit (180) then determines new parameters (0') for the normalizing flow (70). The new parameters (V) may especially be new weights of the normalizing flow (70). For this purpose, the modification unit (180) determines a density value for the input image ($x_i$) by determining a negative log-likelihood value of the output ($\hat{y}_i$). In the embodiment, a multivariate normal distribution is used as probability density function, wherein the covariance matrix of the normal distribution is the identity matrix. In other embodiments, other probability density functions may be used, e.g., multivariate normal distributions with covariance matrices other than the identity matrix, multivariate student-T distributions or multivariate generalized extreme value distributions.

The modification unit (180) determines the new parameters ($\Phi'$) based on the first loss value. In the given embodiment, this is done using a gradient descent method, preferably stochastic gradient descent, Adam, or AdamW. As gradient, the modification unit uses the natural gradient of the parameters ($\Phi$) with respect to the density value.

Afterwards, the normalizing flow (70) and its new parameters ($\Phi'$) are provided as trained normalizing flow (71) by the training system (140).

In other preferred embodiments, training is repeated iteratively for a predefined number of iteration steps or repeated iteratively until the first loss value falls below a predefined threshold value before the normalizing flow (70) and its new parameters ($\Phi'$) are provided as trained normalizing flow (71). Alternatively or additionally, it is also possible that the training is terminated when an average density value with respect to a test or validation data set falls below a predefined threshold value. In at least one of the iterations the new parameters ($\Phi'$) determined in a previous iteration are used as parameters ($\Phi$) of the normalizing flow (70).

Furthermore, the training system (140) may comprise at least one processor (145) and at least one machine-readable storage medium (146) containing instructions which, when executed by the processor (145), cause the training system (140) to execute a training method according to one of the aspects of the present invention.

Figure 12:
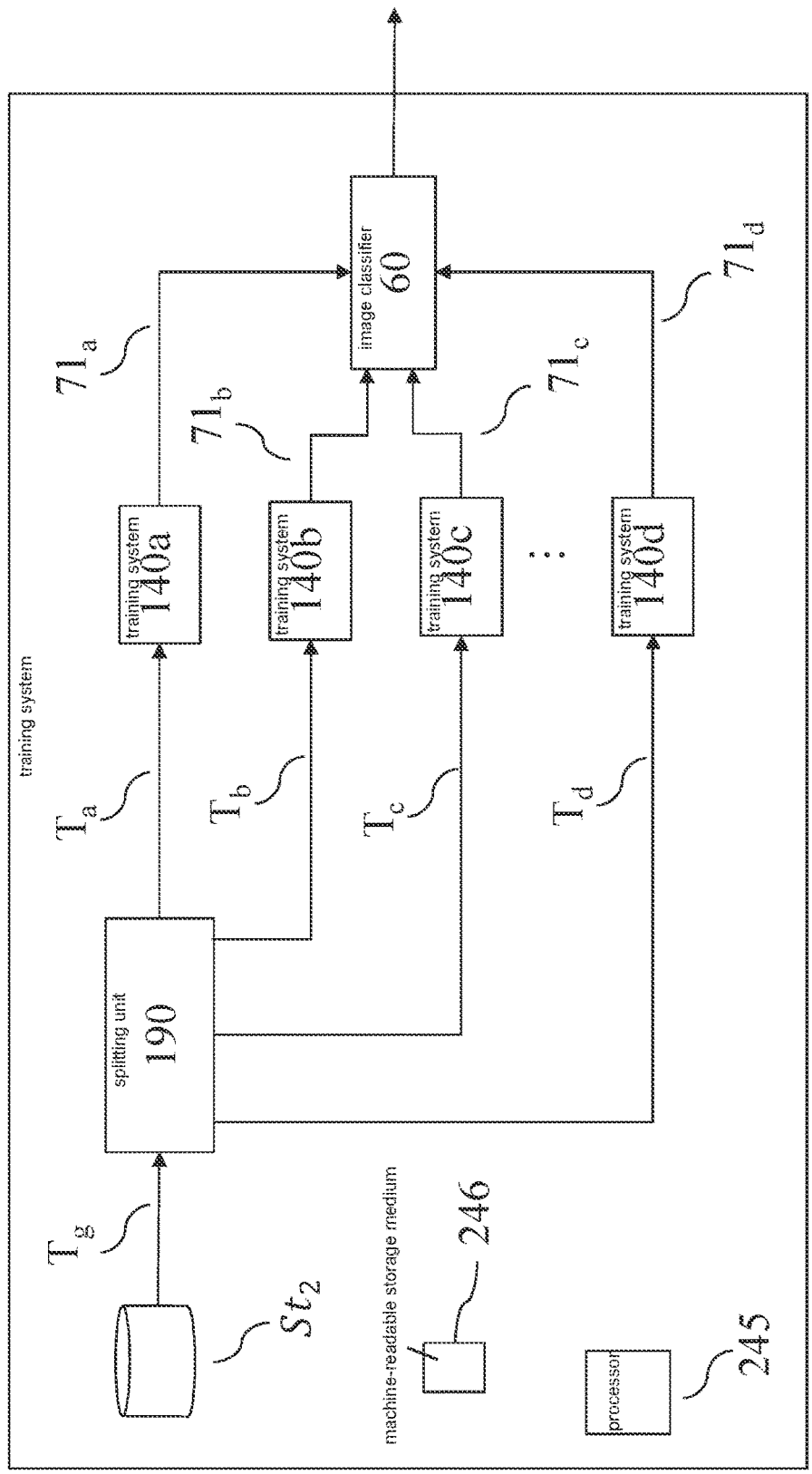
FIG. 12 shows a training system for training the image classifier of the control system, in accordance with an example embodiment of the present invention.

FIG. 12 shows an embodiment of a training system (141) for training the image classifier (60) of the control system (40).

The training system (141) comprises a second computer-implemented database ($St_2$), which provides a training dataset ($T_g$), wherein the training dataset ($T_g$) comprises a plurality of input images ($x_i$) and for each input image ($x_i$) a desired class which the input image ($x_i$) belongs to.

The training dataset ($T_g$) is processed by a splitting unit (190). The splitting unit splits the training dataset ($T_g$) into a plurality of subsets ($T_a$, $T_b$, $T_c$, $T_d$) based on the classes comprised in the training dataset ($T_g$). For example, each subset ($T_a$, $T_b$, $T_c$, $T_d$) may only contain input images ($x_i$) of a single class. It is also possible, that each subset ($T_a$, $T_b$, $T_c$, $T_d$) may comprise input images ($x_i$) from multiple classes.

For each subset ($T_a$, $T_b$, $T_c$, $T_d$) a normalizing flow ($71_a$, $71_b$, $71_c$, $71_d$) is trained using the training system ($140a$-$140d$) for training a normalizing flow (70). The trained normalizing flows ($71_a$, $71_b$, $71_c$, $71_d$) are then provided to the image classifier (60). The training system (141) then provides the trained image classifier (60).

Furthermore, the training system (141) may comprise at least one processor (245) and at least one machine-readable storage medium (246) containing instructions which, when executed by the processor (245), cause the training system (141) to execute a training method according to one of the aspects of the present invention.

The term "computer" may be understood as covering any devices for the processing of pre-defined calculation rules. These calculation rules can be in the form of software, hardware or a mixture of software and hardware.

What is claimed is:

1. A computer-implemented method for training a normalizing flow, wherein the normalizing flow is configured to predict a first density value based on a first input image, wherein the first density value characterizes a likelihood of the first input image to occur, wherein the first density value is predicted based on an intermediate output of a first convolutional layer of the normalizing flow, and wherein the intermediate output is determined based on a plurality of weights of the first convolutional layer, the method for training comprising the following steps:

determining a second input image;
determining an output tensor, wherein the output is determined by providing the second input image to the normalizing flow and providing an output of the normalizing flow as the output tensor; determining a second density value based on the output tensor and on the plurality of weights;

determining a natural gradient of the plurality of weights with respect to the second density value; and adapting the plurality of weights according to the natural gradient;

wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, $*$ denotes a convolution operation and $*^T$ denotes a transposed convolution operation.

2. A computer-implemented method for training an image classifier, wherein the image classifier is configured to determine an output signal characterizing a classification of a first input image, the method comprising the following steps:

determining a training dataset, wherein the training dataset includes a plurality of second input images; training a normalizing flow using the training dataset, wherein the normalizing flow is configured to predict a first density value based on an input image, wherein the first density value characterizes a likelihood of the input image to occur, wherein the first density value is predicted based on an intermediate output of a first convolutional layer of the normalizing flow, and wherein the intermediate output is determined based on a plurality of weights of the first convolutional layer, the training of the normalizing flow including, for each second image of the second input images:

determining an output tensor, wherein the output is determined by providing the second input image to the normalizing flow and providing an output of the normalizing flow as the output tensor, determining a second density value based on the output tensor and on the plurality of weights, determining a natural gradient of the plurality of weights with respect to the second density value, and adapting the plurality of weights according to the natural gradient;

providing the trained normalizing flow to the image classifier; providing the image classifier as a trained image classifier;

wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, $*$ denotes a convolution operation and $*^T$ denotes a transposed convolution operation.

3. The method according to claim 2, wherein the training dataset further includes for each of the second input images a corresponding desired output signal, wherein the desired output signal characterizes a classification of the corresponding second input image, and the method further comprises the following steps:

splitting the training dataset into a plurality of subsets, wherein each subset includes the second input images that correspond with the desired output signals that characterize the same class;

training a respective normalizing flow for each of the subsets, wherein each respective normalizing flow corresponds to the class characterized by the corresponding output signals of the second input images the normalizing flow is trained with; and providing the trained normalizing flows to the image classifier.

4. A computer-implemented method for classifying a first input image using an image classifier, wherein the image classifier provides an output signal characterizing a classification of the first input image, the method comprising the following steps of:

training the image classifier, the training of the imaging classifier including:

determining a training dataset, wherein the training dataset includes a plurality of second input images;

training a normalizing flow using the training dataset, wherein the normalizing flow is configured to predict a first density value based on an input image, wherein the first density value characterizes a likelihood of the input image to occur, wherein the first density value is predicted based on an intermediate output of a first convolutional layer of the normalizing flow, and wherein the intermediate output is determined based on a plurality of weights of the first convolutional layer, the training of the normalizing flow including, for each second image of the second input images:

determining an output tensor, wherein the output is determined by providing the second input image to the normalizing flow and providing an output of the normalizing flow as the output tensor, determining a second density value based on the output tensor and on the plurality of weights, determining a natural gradient of the plurality of weights with respect to the second density value, and adapting the plurality of weights according to the natural gradient;

providing the trained normalizing flow to the image classifier;

providing the image classifier as a trained image classifier;

predicting a first density value for the first input image using the trained normalizing flow from the image classifier;

providing the output signal such that the output signal characterizes a first class when the first density value is below than a predefined threshold;

providing the output signal such that the output signal characterizes a second class when the first density value is equal to the predefined threshold or above the predefined threshold;

wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, $*$ denotes a convolution operation and $*^T$ denotes a transposed convolution operation.

5. The method as recited in claim 4, wherein a device is operated based on the output signal.

6. A computer-implemented method for classifying a first input image using an image classifier, wherein the image classifier provides an output signal characterizing a classification of the first input image, the method comprising the following steps:
training the image classifier wherein the image classifier is configured to determine an output signal characterizing a classification of a first input image, the image classifier being trained by performing the following steps:
determining a training dataset, wherein the training dataset includes a plurality of second input images, and wherein the training dataset further includes for each of the second input images a corresponding desired output signal, wherein the desired output signal characterizes a classification of the corresponding second input image;
splitting the training dataset into a plurality of subsets, wherein each subset includes the second input images that correspond with the desired output signals that characterize the same class;
training a respective normalizing flow for each of the respective subsets, wherein each of the respective normalizing flows is configured to predict a first density value based on an input image, wherein the first density value characterizes a likelihood of the input image to occur, wherein the first density value is predicted based on an intermediate output of a first convolutional layer of the respective normalizing flow, and wherein the intermediate output is determined based on a plurality of weights of the first convolutional layer, wherein each respective normalizing flow corresponds to the class characterized by the corresponding output signals of the second input images the normalizing flow is trained with, and wherein the training of the respective normalizing flow includes, for each second image of the respective subset:
determining an output tensor, wherein the output is determined by providing the second input image to the normalizing flow and providing an output of the normalizing flow as the output tensor,
determining a second density value based on the output tensor and on the plurality of weights,
determining a natural gradient of the plurality of weights with respect to the second density value, and
adapting the plurality of weights according to the natural gradient;
providing the trained respective normalizing flows to the image classifier;
providing the image classifier as a trained image classifier;
predicting a plurality of first density values, wherein the plurality of first density values is predicted by providing the first input image to the trained normalizing flows from the image classifier and providing the first density values predicted from the normalizing flows as the plurality of first density values;
adapting each first density value of the plurality of first density values, wherein each first density value is adapted by multiplying it with a predefined value;
providing the plurality of first density values as an output signal;
wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, * denotes a convolution operation and $*^T$ denotes a transposed convolution operation.

7. An image classifier configured to classify a first input image, wherein the image classifier is configured to provide an output signal characterizing a classification of the first input image, the image classifier being trained by:
determining a training dataset, wherein the training dataset includes a plurality of second input images; training a normalizing flow using the training dataset, wherein the normalizing flow is configured to predict a first density value based on an input image, wherein the first density value characterizes a likelihood of the input image to occur, wherein the first density value is predicted based on an intermediate output of a first convolutional layer of the normalizing flow, and wherein the intermediate output is determined based on a plurality of weights of the first convolutional layer, the training of the normalizing flow including, for each second image of the second input images:
determining an output tensor, wherein the output is determined by providing the second input image to the normalizing flow and providing an output of the normalizing flow as the output tensor,
determining a second density value based on the output tensor and on the plurality of weights,
determining a natural gradient of the plurality of weights with respect to the second density value, and
adapting the plurality of weights according to the natural gradient;
providing the trained normalizing flow to the image classifier;
providing the image classifier as a trained image classifier; wherein image classifier is configured to predict a first density value for the first input image using the trained normalizing flow;
wherein the image classifier is configured to provide the output signal such that the output signal characterizes a first class when the first density value is below than a predefined threshold; and
wherein the image classifier is configured to provide the output signal such that the output signal characterizes a second class when the first density value is equal to the predefined threshold or above the predefined threshold;
wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, * denotes a convolution operation and $*^T$ denotes a transposed convolution operation.

8. A training system configured to train a normalizing flow, wherein the normalizing flow is configured to predict a first density value based on a first input image, wherein the first density value characterizes a likelihood of the first input image to occur, wherein the first density value is predicted based on an intermediate output of a first convolutional layer of the normalizing flow, and wherein the intermediate output is determined based on a plurality of weights of the first convolutional layer, the training system configured to:

determine a second input image;

determine an output tensor, wherein the output is determined by providing the second input image to the normalizing flow and providing an output of the normalizing flow as the output tensor;

determine a second density value based on the output tensor and on the plurality of weights;

determine a natural gradient of the plurality of weights with respect to the second density value; and adapt the plurality of weights according to the natural gradient;

wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, * denotes a convolution operation and $*^T$ denotes a transposed convolution operation.

9. A training system configured to train an image classifier, wherein the image classifier is configured to determine an output signal characterizing a classification of a first input image, the training system configured to:

determine a training dataset, wherein the training dataset includes a plurality of second input images;

train a normalizing flow using the training dataset, wherein the normalizing flow is configured to predict a first density value based on an input image, wherein the first density value characterizes a likelihood of the input image to occur, wherein the first density value is predicted based on an intermediate output of a first convolutional layer of the normalizing flow, and wherein the intermediate output is determined based on a plurality of weights of the first convolutional layer, the training of the normalizing flow including, for each second image of the second input images:

determination of an output tensor, wherein the output is determined by providing the second input image to the normalizing flow and providing an output of the normalizing flow as the output tensor;

determination of a second density value based on the output tensor and on the plurality of weights, determination of a natural gradient of the plurality of weights with respect to the second density value, and adaptation the plurality of weights according to the natural gradient;

provide the trained normalizing flow to the image classifier;

provide the image classifier as a trained image classifier;

wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, * denotes a convolution operation and $*^T$ denotes a transposed convolution operation.

10. A non-transitory machine-readable storage medium on which is stored a computer program for training a normalizing flow, wherein the normalizing flow is configured to predict a first density value based on a first input image, wherein the first density value characterizes a likelihood of the first input image to occur, wherein the first density value is predicted based on an intermediate output of a first convolutional layer of the normalizing flow, and wherein the intermediate output is determined based on a plurality of weights of the first convolutional layer, the computer program, when executed by a processor, causing the processor to perform the following steps:

determining a second input image; determining an output tensor, wherein the output is determined by providing the second input image to the normalizing flow and providing an output of the normalizing flow as the output tensor;

determining a second density value based on the output tensor and on the plurality of weights; determining a natural gradient of the plurality of weights with respect to the second density value; and adapting the plurality of weights according to the natural gradient;

wherein the natural gradient is determined according to the formula:

$$\nabla_{w^{(l)}} = \delta_l * (w^{(l)} *^T h^{(l)})^T + w^{(l)} \cdot H^l \cdot W^l,$$

wherein $\nabla_{w^{(l)}}$ is the natural gradient, $\delta_l$ is an error signal for the first convolutional layer, $w^{(l)}$ is the plurality of weights, $H^l$ is a height of a layer input of the first convolutional layer, $W^l$ is a width of the layer input, * denotes a convolution operation and $*^T$ denotes a transposed convolution operation.

* * * * *